Patented Mar. 14, 1950

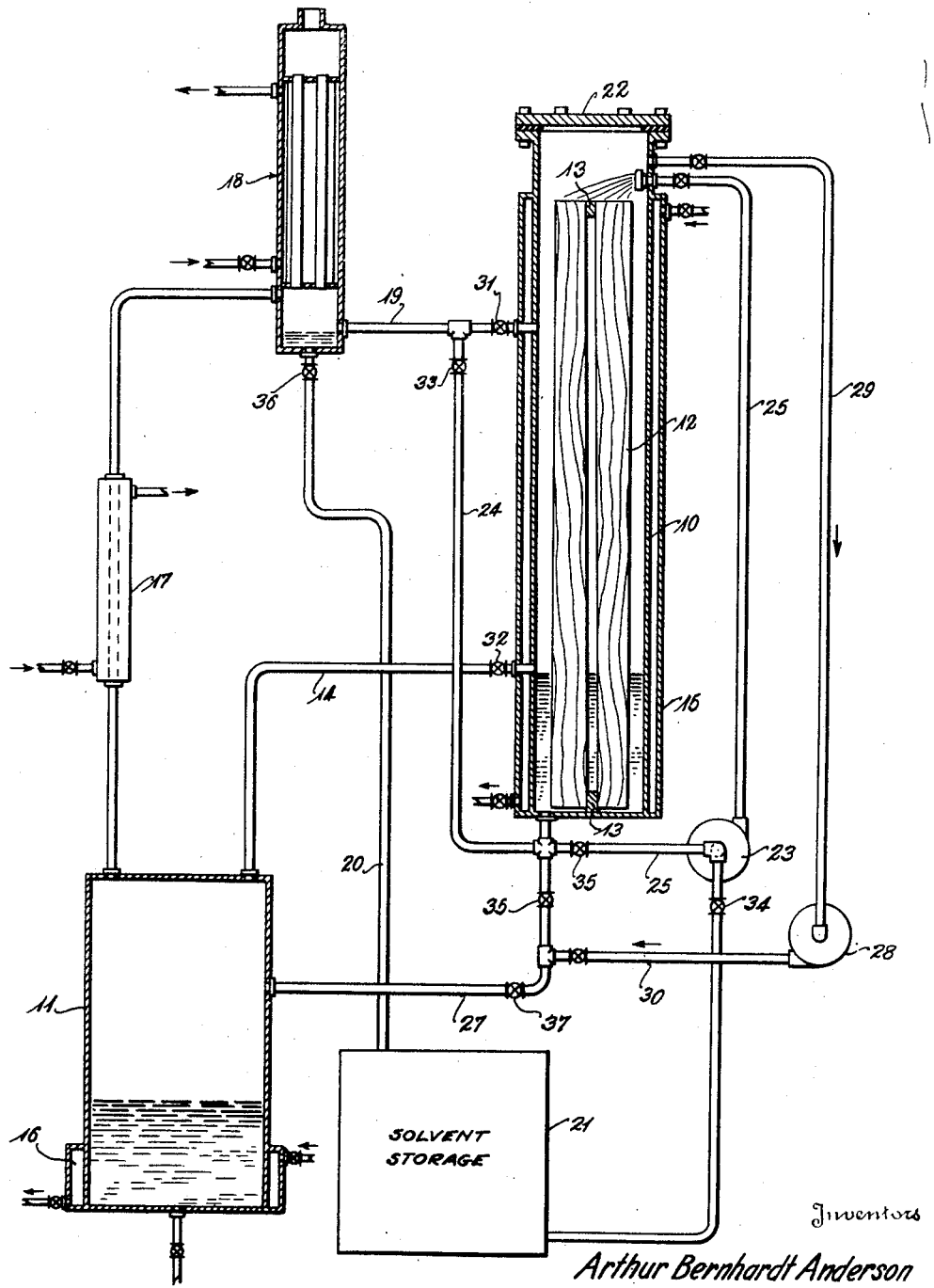

2,500,783

UNITED STATES PATENT OFFICE 2,500,783

PROCESS OF TREATING WOOD

Arthur Bernhardt Anderson, Milwaukie, and Albert Hermann, Portland, Oreg., assignors to Western Pine Association, Portland, Oreg., a corporation of Oregon Continuation of application Serial No. 451,812, July 21, 1942. This application January 8, 1947, Serial No. 720,769

2 Claims. (Cl. 34—9.5)

The invention relates to a new and useful process for extracting from lumber any unwanted excess of moisture it may contain together with such other materials as are soluble in the several solvents that may be employed.

In the numerous processes that constitute the prior art of seasoning lumber so far as known to us, there is one characteristic common to all viz. that the moisture and some other volatile products are removed by evaporation brought about through the application of heat. The heat of evaporation may be applied to or generated within the material being seasoned, in numerous ways.

Our invention differs from all of those in the prior art of which we are aware, in that moisture and other extractives are removed from lumber by diffusion and/or extraction with suitable solvents, during which process the extractives are usually not evaporated but are removed in a liquid form. Fundamentally the process consists of submerging the lumber to be treated in or otherwise exposing the same to the proper solvent or solvents, which may be in liquid or vapor form. While we prefer water miscible solvents which have boiling points below that of water, the solvent may, of course, boil at temperatures higher than that of water. Examples of water miscible solvents that may be employed are acetone, methyl formate, methyl alcohol, ethyl alcohol, etc. Also we do not restrict the invention to the use of one solvent but a mixture of two or more water miscible solvents may be used—such as acetone and methyl acetate, acetone and methyl alcohol, acetone and ethyl alcohol, etc.

In addition to water miscible solvents, water immiscible solvents may be used in combination with water miscible solvents. As examples such a mixture may comprise benzene and ethyl alcohol, chlorinated hydrocarbon and acetone, various petroleum fractions and methyl alcohol, etc. Any water miscible material which will not lessen the value of the lumber for the use intended falls within the purview of the invention, so far as its object of removing moisture is concerned. For the removal from the lumber of materials not soluble in water, any solvent for such materials, which solvent is miscible with a water-miscible, usable material and which is not deleterious to the wood, for its intended purpose, falls within the invention.

It is an important feature of the invention to make possible the use of water immiscible solvents. Such solvents are not available for use alone since they cannot get into the wood to any appreciable or useful extent, being excluded by the moisture present with which the water immiscible solvent will not diffuse. By mixing such solvents with other solvents with which they are miscible and which other solvents are also miscible with water, the water immiscible solvents may be introduced into the wood in the mixture, the water miscible component of the mixture acting to take water from the wood and the water immiscible component acting to take out water insoluble extractives not soluble in the water miscible component.

The benefits of solvent extraction of lumber are numerous. Resinous woods such as the several species of the genera Pinus, Pseudotsuga, Abies and others yield to the process much of their natural resin, oil, fat and gum content which might be deleterious to their subsequent use in the arts. For example, the several species of the genus Pinus dried under methods employed in the prior art of seasoning may exude from the sapwood, globules of resinous materials before or after painting that are highly objectionable. The heartwood of these species occasionally exhibits characteristics which cause discoloration of light colored finishes that may have been applied, when the lumber has been dried under one of the methods constituting the prior art. The knots of the genus Pinus are especially rich in extractive materials that are not removed by seasoning methods constituting the prior art, and lumber containing such knots presents great difficulties in painting since paint films become discolored over or become separated from such knot areas. The knots require special treatment before or during the painting process such as special primer coats or local heating with a torch to even partially prevent premature failure or discoloration of the superimposed paint films. Lumber seasoned by our process has nearly all of the troublesome resins, oils, fats, etc. removed and may be painted by commonly employed methods and materials without exhibiting objectionable exudations or discolorations. Knots accept and hold paint films as readily as other areas.

Some of the methods of seasoning lumber included in the prior art tend to cause objectionable discolorations at the time of seasoning, or leave within the wood materials which darken rapidly on subsequent exposure to light and air. Since our method of seasoning causes no discoloration at the time of seasoning and removes much of the material which tends to discolor upon exposure to light and air, it more nearly retains the original colors of finishes that may be applied.

The methods by which our extraction may be accomplished are several. Green or seasoned wood may be simply immersed in the solvent or solvents at atmospheric or room temperatures and the mutual interchange or diffusion of solvent or solvents with the solutes permitted to proceed until a sufficient amount of extractives including water has been removed from the wood. During the process, fresh substantially pure solvent is preferably added to the bath intermittently or continuously and used solvent containing water and other extractives is removed from the vessel intermittently or continuously. The solvent or solvents and extractives withdrawn are then separated by boiling off, and recovering the solvent or solvents. The residual water and other extractives may be wasted or they may be separated by boiling off the water or by employing well known chemical or physical methods to recover the extractives other than the water, which would normally be wasted. This process may be modified by heating the bath or vessel in which the extraction is conducted to the boiling point of the single solvent if such be employed, or to the boiling point of the mixed solvents, if a multiplicity of solvents be employed.

Upon completion of the extraction, the solvent or solvents absorbed by the wood are evaporated by heating the extractor by any convenient means to a temperature above the boiling point or boiling points of the solvent or solvents, the solvents being thus rapidly removed from the wood by boiling them off, and the solvent vapor or vapors recovered for reuse by a suitable condenser or other well known solvent vapor recovery devices, or a combination of such condenser and other recovery devices.

Another method of extraction in accordance with the invention, is to expose the wood to be extracted in a suitable vessel to the vapor or vapors of a suitable solvent or solvents allowing the drip of condensed solvent to fall upon the woody material and after diffusion to fall to the bottom of the vessel, or to drain to a second vessel from which the solvent is re-evaporated and returned to the extractor for further use. The eventual recovery of the solvent and extractives would be in the manner previously described.

Various combinations of applying solvent or solvents to the wood to be extracted either in liquid or vapor or liquid and vapor form may be employed. Thus reduced pressures, atmospheric or pressures above atmospheric may be employed in carrying out this process. Except as recited in the appended claims we do not limit our invention to one method or to a particular combination of methods of applying solvent or solvents, of supplying fresh pure solvent to the extractor or to the recovery of the solvent from the extracted wood or the recovery of solvent or solvents and extractives from the spent solvents.

We do employ a preferred method which is to be described and which is illustrated in the appended drawing in which the figure is a diagrammatic illustration of one form of apparatus which may be utilized.

In the preferred method of extraction using the illustrated apparatus we employ two separate vessels designated as an extractor 10 and a stripper 11. In the extractor is placed, preferably in an approximately vertical position, as in Figure 1, the wood 12 to be extracted, the several pieces being separated by separators 13. The extractor is positioned above the stripper in such manner that solvent containing extractives may drain by gravity to the stripper through a pipe 14 connecting the two vessels.

The extractor is equipped with a steam jacket 15 or other convenient heating device to maintain the solvent at or near boiling temperature. The stripper is steam jacketed as at 16 or heated by any other convenient means. Above the stripper is located a fractionating column 17 connected to a condenser 18 at a point some distance above a pipe 19 leading back to the extractor. At the low point of the condenser is a pipe line 20 by which solvent may be drained to the solvent storage tank 21.

The cycle of operation in use of the illustrated operation is as follows. Wood to be extracted is placed in any convenient manner in the extractor through a vapor tight cover 22 and the cover fastened and made vapor-tight. Solvent is introduced into the extractor in sufficient amount to fill it to the level of the drain pipe 14 and into the stripper to a level above the steam jacket. Steam is introduced into the steam jacket of the stripper and into the steam jacket of the extractor to bring both to the solvent boiling temperature. In the extractor the steam supply is limited to permit only gentle boiling of the solvent while in the stripper the solvent is boiled vigorously. Solvent vapor rises from the liquid surface in the stripper and moves through the fractionating column 17 to the condenser 18. When condensed solvent in the bottom of the condenser rises above the connecting pipe 19 it flows by gravity into the extractor. In the extractor the solvent has become diluted with water and other extractives. The stream of pure solvent from the condenser causes the liquid level in the extractor to rise and overflow into the stripper, through pipe 14 from whence the cycle is repeated. The resultant action therefore, is a stream of solvent containing extractives flowing from the extractor 10 to the stripper 11 and a corresponding stream of substantially pure solvent flowing from the stripper to the extractor. The contents of the stripper gradually change from pure solvent to solvent increasingly charged with extractives, while the pure solvent continuously introduced into the extractor continues to reduce the extractive content of the wood until the process is completed.

To increase the flow of solvent over the wood a pump 23 withdraws solvent from the bottom of the extractor and such solvent as is flowing from the condenser through pipe 19 and discharges it through pipe 25 and a suitable nozzle 26 upon the top of the charge of lumber.

When the extraction process is complete, all of the solvent in the extractor is drained through pipe 27 to the stripper. The wood in the extractor has now been cleared of the excess of moisture and other extractives, but is substantially saturated with solvent. The heat supply to the extractor is now increased to increase its temperature and that of its contents above the boiling point of the solvent. To make the temperature within the extractor nearly uniform and to carry the heat of solvent evaporation to all of the pieces of wood within the extractor, a positive blower 28 withdraws solvent vapor from the top of the extractor through a pipe 29 and returns it to the bottom of the extractor through pipe 30. The solvent evaporated from the wood flows through pipe 19 to the condenser 18 from which the condensate drains through pipe 20 to the solvent storage tank.

When the solvent has been completely evaporated from the lumber it is removed from the extractor and is ready for fabrication or use. Valves 31, 32, 33, 35 and 37 in pipes 19, 14, 24, and 27 are now closed and the solvent in the stripper is boiled vigorously. The vapor formed moves through the fractionating column 17 to the condenser 18 from which the condensate flows by gravity to the solvent storage tank, the valve 36 being opened. When all of the solvent has been removed from the mixture in the stripper the extractives remaining in the stripper are drained off to be wasted or refined as desired.

The described operation provides a combined vapor and liquid contact method of treatment. The same apparatus may be operated to provide a purely immersion type of treatment. To this end the valve 34 may be opened and valves 35 and 35′ closed, causing the pump to draw from tank 21 of pure solvent. The valves 35 and 35′ will be initially closed until the extractor 10 is filled with solvent after which the amount of opening of valves 35, 35′ and 34 and the speed of pumping will be mutually adjusted to keep the level of solvent in the extractor above the level of the wood. The spent solvent from the extractor passes through open valve 37 into stripper 11, while a like amount of fresh solvent is continually supplied to the lumber from tank 21 through pump 23. The spent solvent is recovered from stripper 11, from here pure solvent passes to the condenser to be condensed and returned to tank 21, valve 36 being open.

While we have described the preferred method of extraction in detail we do not confine ourselves to this particular arrangement of the several component elements. Neither do we confine our invention to the employment of the particular devices illustrated.

When subjecting *Pinus ponderosa* heart wood to this process 1 inch thick stock is dried to approximately 10% moisture content (on dry basis) in a maximum of 12 hours, while kiln drying practice requires a minimum of 20 to 72 hours. In the case of 1½ inch thick *Pinus ponderosa* sap wood, the solvent method requires a maximum of 24 hours to dry to 10% moisture content, while this same stock in a regular dry kiln would require from 120 to 144 hours to dry to the corresponding moisture content. In the case of 3 inch thick *Pinus ponderosa* heart wood, the solvent process requires from 48 to 60 hours, while this stock in the dry kiln process would require from 360 to 432 hours or from 15 to 18 days.

Our extraction process dehydrates wood much more rapidly than most processes employed in the prior art and with a minimum of damage to the quality of the wood. Surface checking of the wood is almost completely absent, and end checking is rare. Since some of the solvents employed enter into the microscopic structure of the wood in a manner similar to water, only a slight amount of shrinkage occurs during the extraction process and that only during the latter portion of the extraction process. Additional shrinkage occurs with the evaporation of the solvent or solvents. Since these are evaporated at the boiling temperature or temperatures of the solvent or solvents, internal drying stresses occurring in the wood are distinctly less than those resulting from any of the practical processes under the prior art. Well known methods of removing residual drying stresses are equally effective on wood seasoned by our process as in wood dried under methods comprising the prior art.

A specialized field to which the invention may be applied is the treatment of pulp wood either as such or the chips made therefrom before digestion to produce the pulp, or wood to be ground to produce "ground wood" for inclusion in paper making stock. By application of the invention to this material, a better paper stock may be prepared or stock equal to that formerly available may be prepared with increased facility.

By the term "extractives" as used herein and in the following claims is meant such naturally occurring materials as resin, oil, fats, gums and fatty and resin acids, and does not include any material as cellulose, hemi cellulose, lignin or other material which comprises a part of the wood itself.

This application is a continuation and substitute for our application filed July 21, 1942, Serial No. 451,812, now abandoned.

Minor changes may be made in the physical embodiment of the invention within the scope of the appended claims without departing from the spirit of the invention.

We claim:
1. The process of treating lumber to remove excess moisture and at least a portion of the extractives which comprises: placing the lumber in a position with the resin ducts and cellular openings thereof extending substantially vertical; flowing a water miscible solvent liquid into contact with the uppermost end of the lumber and downwardly by gravity and diffusion through the resin ducts and other natural openings of the wood to dissolve and remove water and extractives from the wood; replacing charged solvent with fresh solvent; terminating the treatment when the moisture in the lumber has been reduced to the desired amount; and removing the residual solvent from the lumber by distillation.

2. The process of claim 1 in which the solvent comprises a plurality of liquids boiling below 100° C., miscible with each other and at least one of which is miscible with water.

ARTHUR BERNHARDT ANDERSON.
ALBERT HERMANN.

REFERENCES CITED

The following references are of record in the file of this patent:

UNITED STATES PATENTS

| Number | Name | Date |
|---|---|---|
| 117,135 | Adamson | July 18, 1871 |
| 1,051,580 | Heap | Jan. 28, 1913 |
| 1,059,820 | Besemfelder | Apr. 22, 1913 |
| 2,060,902 | Stamm | Nov. 17, 1936 |
| 2,273,039 | Hudson | Feb. 17, 1942 |

FOREIGN PATENTS

| Number | Country | Date |
|---|---|---|
| 359,641 | Great Britain | Oct. 29, 1931 |